Patented May 5, 1931

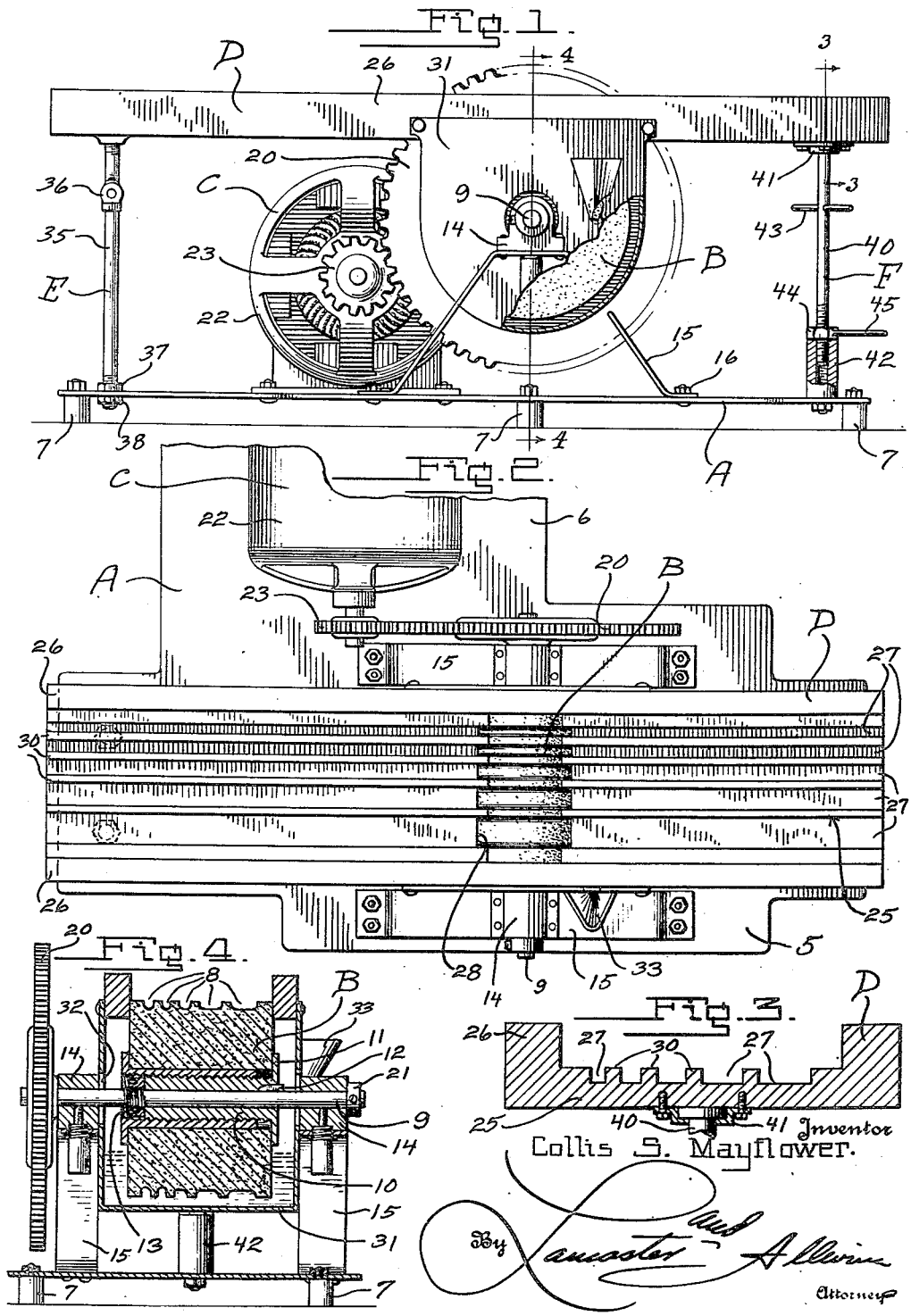

1,804,263

UNITED STATES PATENT OFFICE

COLLIS S. MAYFLOWER, OF FLAGSTAFF, ARIZONA

GLASS EDGING MACHINE

Application filed April 26, 1926. Serial No. 104,812.

The present invention relates to glass grinding machines, and more specifically to machines of this character for use in the finishing of the edges of glass plates.

The primary object of the invention is to effect the grinding and finishing of glass plates in local hardware stores or garages from salvaged broken plate glass windows.

A further object of the invention is to provide a portable glass edging machine embodying features of construction whereby the edges of glass plates of different thicknesses may be finished in an efficient and expeditious manner.

A still further object of the invention is to provide a portable type of glass edging machine embodying an adjustable edging cable capable of relative movement with respect to the grinding element of the machine.

A still further object of the invention is to provide a novel type of portable glass edging machine which is extremely simple and durable in construction, and which may be produced at a relatively low cost thus rendering the machine susceptible of being installed as a part of a garage or hardware store equipment for use in utilizing salvaged sheets of glass of various thicknesses.

Other objects and advantages of the invention will be apparent during the course of the following detailed description, taken in connection with the accompanying drawing forming a part of this specification and in which drawing:

Figure 1 is a side elevation of the machine and showing certain portions broken away for illustrating certain details of construction.

Figure 2 is a top plan view of the machine.

Figure 3 is an enlarged fragmentary section on line 3—3 of Figure 1.

Figure 4 is a vertical section on line 4—4 of Figure 1 and looking in the direction of the arrows.

Referring to the drawing in detail, and wherein similar reference characters designate corresponding parts throughout the several views, the letter A designates a supporting base or bed plate, B a grinding element rotatably supported upon the plate A, C a driving means for the grinding element B, D an edging table upon which plates of glass may be disposed in a vertical position for movement into engagement with the grinding element B, and E and F adjustable supporting means disposed at opposite ends of the edging table D for independent movement of each end of the table vertically with respect to the grinding element B.

The bed plate A which is preferably formed from a sheet of metal of a suitable gauge, is of an irregular outline in plan and embodies a main body portion 5 upon which the grinding element B and table D may be supported, and an offset minor body portion 6 of a size sufficiently large enough for supporting of the driving means C. Feet 7 may be suitably disposed beneath the plate A for elevating of the plate a slight distance above the floor surface and if desirable the feet may be adjustable for leveling purposes.

The grinding element B is in the form of a grinding wheel, and is formed at its circumferential face with a series circumferentially extending grooves 8. As is clearly illustrated in Figure 4, these circumferentially extending grooves 8 are of various widths with ribs of substantially like thickness between each adjacent groove. It is preferred that these grooves 8 progressively increase in width from one side edge of the wheel to the opposite side as illustrated in Figure 4. This grinding element or wheel B is provided with an axially disposed opening whereby the wheel may be mounted upon a shaft 9 as by means of a suitable locking arrangement 10. This locking means 10 may be in the form of telescoping screw threaded members having flanges 11 formed at their outer ends for engaging opposite sides of the wheel, and with the inner member locked to the shaft 9 by means of a key 12 and a jam nut 13. The opposite end portions of the shaft 9 may be journaled in suitable journal boxes 14 carried by brackets 15 secured at their low ends to the bed plate A as by suitable bolts 16. These brackets 15 may be formed of strap iron, and are disposed in parallel relation to one another longitudinally of the main body portion 5 of the bed plate. A driving gear 20 is rigidly mounted upon one end of the shaft 9 and bears against one of the boxes 14, and a suitable collar 21 may be mounted upon the opposite end of the shaft for preventing longitudinal shifting of the shaft.

The driving means C preferably consist of an electric motor 22 which is mounted upon the minor body portion 6 of the bed plate, and which motor has mounted upon its shaft a pinion 23 which is adapted for meshing relation with the driving gear 20.

Referring now to the edging table A and which is of elongated formation, the same embodies a base section 25 having upstanding guide flanges 26 extending throughout the length of the base section at each longitudinal edge of the section. Provided in the upper face of the base section 25, is a series of longitudinally extending grooves or channels 27 which extend throughout the length of the base section and open at each end of the section. These grooves or channels 27 are also of varying widths from one side of the base section to the opposite side, and are of corresponding width to the grooves 8 provided in the grinding wheel B. Provided intermediate the ends of the edging table D, and transversely of the base section 25 thereof, is an opening 28 which is adapted to be disposed above the grinding wheel B so that when a pane of glass is moved longitudinally in the channels 27, the glass will be caused to move into engagement with the grinding wheel. As will be observed in Figure 2, when the wheel B and table D are disposed in proper relation, the grooves 8 of the grinding wheel will align with the channels 27 of the edging table. The channels 27 of the base section 25 form ribs 30 between each adjacent channel which serve as guides for retaining the glass plate in the desired channel. The upstanding longitudinal flanges 26 aside from serving as guards for preventing slipping of the glass from the base section 25, also serve as a rigid connection between the divided portions of the base section. As will be observed in Figure 4 the wheel B is of a width equal to the distance between the flanges 26 and which necessitate the forming of the opening 28 for the entire width of the base section thus dividing the base section into two portions connected by means of the guide flanges 26.

Supported upon the table D is a trough or dip pan 31 for holding a suitable quantity of water or polishing liquid into which the grinding wheel B may move for saving wear to the wheel and also for obtaining a finer polish on the edge of the glass being ground. This pan 31 is disposed between the brackets 15 and about the grinding wheel B, and has provided in its side walls, relatively large openings 32 through which shaft 9 may extend in a manner for permitting of relative adjustment of the table D with respect to the grinding wheel. A suitable spout 33 may be secured to one side of the pan for permitting of the liquid being poured into the pan.

Referring now to the supporting means E for adjustable supporting of one end of the table D, the same comprises a pair of spaced uprights 35 being connected intermediate their ends by means of a suitable hinge joint 36, the pivot pins of which extend in axial alignment with one another transversely of the edging table. The upper ends of the uprights may be adapted for threaded connection with the under side of the base section 25, while the lower ends of the uprights are threaded for a substantial distance and extend through the bed plate A with a nut 37 threaded upon the upright above the bed plate and a nut 38 threaded upon the upright below the bed plate. Thus it will be seen that upon proper rotation of the nuts 37 and 38 that the end of the table supported by the support E may be vertically adjusted.

The support F for the opposite end of the edging table, comprises an adjusting screw 40 having its upper end rotatably connected beneath the base section 25 as by means of a suitable retaining collar 41. The lower end of the screw 40 is provided with screw threads for threading into a suitable block 42 supported upon the bed plate A and which block 42 is preferably formed with a substantially long threaded bore as illustrated in Figure 1. A suitable handle 43 is provided for rotation of the screw 40, and a nut 44 threaded upon the lower end of the screw 40 and engaging upon the upper end of the block 42, serves as a lock nut for retaining the adjusting screw in a set position. It will readily be apparent that upon loosening of the nut 44 as by the handle 45, that the screw 40 may be rotated for raising and lowering of one end of the edging table, the opposite end of the table pivoting about the hinge connections 36. The object in so vertically moving the edging table with respect to the grinding wheel B, is to permit of the channels 27 being disposed in proper relation to the grooves 8 upon slight wearing of the grinding wheel. This adjustment will ordinarily be taken care of by means of the adjustable support F, and when further adjustment of the table becomes necessary, the supports E may be adjusted by means of the bolts 37 and 38.

The object in so having the grooves 8 and co-acting channels 27 of varying thicknesses, permits of different thicknesses of glass ranging from double strength as used in glass enclosed vehicles, to the one-quarter inch and thicker types of plate glass being operated upon for grinding and finishing the edges of the glass.

At present, the grinding of glass is done on large machines at factories, and with the frequent breaking of glass windows or the like as used upon the closed types of motor vehicles, it is quite often necessary to send to the factory for a new glass thus resulting in a loss of time and considerable inconvenience. With a novel and economical type of portable glass edging machine as defined in this application, broken plate glass windows, and of which there is a good supply in practically all localities, may be utilized in the renewing of door panes for closed vehicles, or glass shelves, etc. The low cost of manufacture of a glass edging machine as defined will permit of the machine being installed on a paying basis in garages or hardware stores for making use of salvage broken plate glass windows or the like.

In use, and after the glass has been cut to its proper size, it is disposed in a proper channel 27 in accordance with the thickness of the glass, and is then passed back and forth on the table by hand from right to left against the grinding wheel B thus rounding and finishing the edges of the glass. The portions of the base section 25 to each side of the grinding wheel, will serve to keep a straight edge upon the glass being operated upon.

While in the example shown the grinding element B has been shown as a grinding wheel provided with a series of circumferentially extending grooves of different widths and characteristics, it is to be understood that if so desired the grinding element may consist of a plurality of disc like grinding wheels arranged in abutting relation and each being provided with a circumferentially extending cutting groove.

From the foregoing description it will be apparent that an extremely simple and novel type of portable glass edging machine has been provided which will be found extremely desirable for use in grinding and finishing the edges of glass plates of various thicknesses, and which machine is of such simple construction as to permit of its being manufactured and sold at a relatively low cost thus permitting of the machine being installed on a paying basis in garages or the like for use in utilizing salvaged plate glass.

Changes in detail may be made to the specific form of the invention herein shown and described, as well as adaptation of the machine for use in grinding and finishing of the edges of plates of various characters, without departing from the spirit of the invention or the scope of the following claim.

I claim:

In a glass edging machine including a bed plate, a grinding element rotatably mounted upon said plate, and an edging table disposed transversely above the grinding element, means for adjustably supporting the table above the grinding element comprising a pair of vertically adjustable uprights supporting one end of the table upon the bed plate and each having a hinged joint the axes of which align transversely of the table, and a vertically adjustable support for the opposite end of the table comprising an adjusting screw rotatably connected at its upper end to the under side of the edging table at the longitudinal center thereof and having a screw threaded lower end, and a block rigidly carried by the bed plate and having a vertically extending threaded bore for receiving the lower threaded end of the adjusting screw.

COLLIS S. MAYFLOWER.